United States Patent [19]

Cykana et al.

[11] Patent Number: 5,565,159
[45] Date of Patent: Oct. 15, 1996

[54] METHOD AND APPARATUS FOR MANUFACTURING AN EXTRUSION HAVING AN UNEVEN SURFACE

[75] Inventors: Daniel Cykana; Steven F. Schick, both of Sheboygan, Wis.

[73] Assignee: Bemis Manufacturing Company, Sheboygan Falls, Wis.

[21] Appl. No.: 412,462

[22] Filed: Mar. 29, 1995

[51] Int. Cl.$^6$ .................................................. B29C 47/88
[52] U.S. Cl. .................... 264/177.19; 264/211.13; 264/237; 264/342 R; 264/348; 425/378.1; 425/380
[58] Field of Search ............... 264/177.17, 177.19, 264/237, 209.1, 348, 209.3, 209.4, 209.5, 167, 560, 563, 341, 343, 340, 211.13, 342 R; 425/380, 385, 378.1; 156/244.11, 244.13–244.14, 244.25

[56] References Cited

U.S. PATENT DOCUMENTS

| | | | |
|---|---|---|---|
| 2,958,909 | 11/1960 | Bradley et al. | 264/177.17 |
| 3,086,216 | 4/1963 | Brooks et al. | 156/244.25 |
| 3,635,625 | 1/1972 | Voss | 425/385 |
| 3,822,333 | 7/1974 | Haruta et al. | 264/237 |
| 3,876,495 | 4/1975 | Esler | 264/209.1 |
| 3,944,641 | 3/1976 | Lemelson | 264/167 |
| 4,095,543 | 6/1978 | Gassman | 112/417 |
| 4,231,834 | 11/1980 | Gonzalez | 264/167 |
| 4,238,435 | 12/1980 | Liebisch | 264/560 |
| 4,301,726 | 11/1981 | Sato et al. | 101/129 |
| 4,653,425 | 3/1987 | Aguettant et al. | 118/326 |
| 4,753,863 | 6/1988 | Spanjer | 430/138 |
| 5,169,583 | 12/1992 | Moriguchi et al. | 264/177.19 |

*Primary Examiner*—Jeffery R. Thurlow
*Attorney, Agent, or Firm*—Michael, Best & Friedrich

[57] ABSTRACT

A method of manufacturing an etched extrusion, the method comprising the steps of extruding a thermoplastic material to produce a hot extrusion, and contacting the extrusion, while the extrusion is still hot, with a mixture of at least two fluids having different thermal conductivities so that the extrusion develops an uneven outer surface due to different rates of shrinkage caused by the different thermal conductivities.

21 Claims, 1 Drawing Sheet

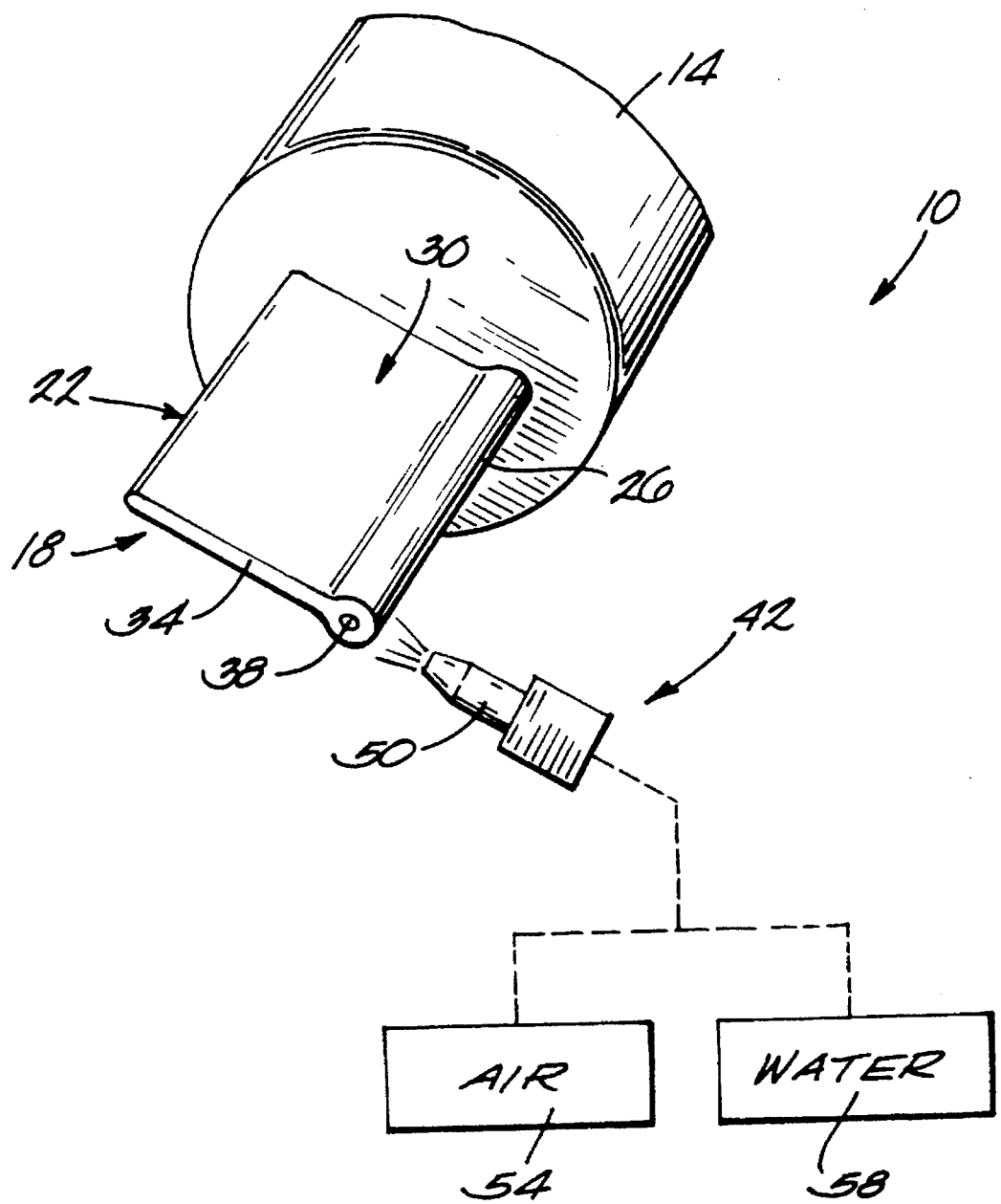

METHOD AND APPARATUS FOR MANUFACTURING AN EXTRUSION HAVING AN UNEVEN SURFACE

BACKGROUND OF THE INVENTION

The invention relates to thermoplastic extruding, and more particularly to methods of manufacturing an etched extrusion.

It is known to etch an extrusion by embossing after the extrusion has cooled. This is done, for example, with extruded automobile seat weltings to provide a grainy or leathery appearance.

SUMMARY OF THE INVENTION

The invention provides an improved method and apparatus for manufacturing an etched thermoplastic extrusion. The method and apparatus of the invention are less expensive and less time consuming than known prior methods and apparatus.

More particularly, the invention provides a method comprising the steps of extruding a thermoplastic material to produce a hot extrusion, and contacting the extrusion, while the extrusion is still hot, with a mixture of at least two fluids having different thermal conductivities so that the extrusion develops an uneven outer surface due to different rates of shrinkage caused by the different thermal conductivities. The extrusion can be in the form of a seat welting having a bead portion, and the mixture of fluids can be sprayed on the bead portion. The thermoplastic material is preferably flexible polyvinyl chloride, although the method is applicable to other thermoplastic materials. The thermoplastic material is preferably extruded at a temperature of at least 300° Fahrenheit and the mixture preferably includes air and water at a temperature of approximately 70° Fahrenheit. The mixture can alternatively include air and a solvent.

Other features and advantages of the invention will become apparent to those skilled in the art upon review of the following detailed description, claims and drawings.

BRIEF DESCRIPTION OF THE DRAWINGS

FIG. 1 is a perspective view of an apparatus embodying the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

FIG. 1 illustrates an apparatus 10 embodying the invention. The apparatus 10 comprises a conventional extruder 14 (partially shown) for extruding a thermoplastic material to produce a hot extrusion 18 in the form of a seat welting 22 having a bead portion 26. Such a seat welting is disclosed in U.S. Ser. No. 08/210,702, which was filed Mar. 18, 1994, which is titled "Automotive Seat Welting", which is assigned to the assignee hereof, and which is incorporated herein by reference. The welting 22 includes a strip 30 consisting of a first plastic material and including a web portion 34 and the bead portion 26. The first plastic material is preferably flexible polyvinyl chloride (PVC). It should be understood, however, that the invention is also applicable to rigid polyvinyl chloride and other thermoplastic materials. The welting 22 also includes a core 38 which consists of a second plastic material and which is co-extruded within the bead portion 26. The second plastic material is preferably a cellulosic propionate. The welting 22 is extruded at a temperature of at least 300° Fahrenheit.

The apparatus 10 also comprises a mechanism 42 for spraying the bead portion 26, while the bead portion is still hot, with a mixture of at least two fluids having different thermal conductivities so that the bead portion 26 develops an uneven (e.g., grainy or leathery) outer surface due to different rates of shrinkage caused by the different thermal conductivities. The mixture is sprayed through a suitable nozzle 50, such as a spray atomizing nozzle. The mixture preferably includes air and water at a temperature of approximately 70° Fahrenheit. The nozzle 50 is thus connected to a source 54 of air and a source 58 of water. In the preferred embodiment, the air is between 35 and 100 psi, and the water flows at a rate of between 0.25 and 3 gallons per minute. The molecules of the bead portion 26 hit by the water shrink faster than the molecules of the bead portion hit by the air, thus providing the uneven surface. The mixture can alternatively include air and a suitable solvent, such as tetrahydrafuran (THF), acetone or methylethylketone (MEK).

Various features of the invention are set forth in the following claims.

We claim:

1. A method of manufacturing an extrusion having an uneven outer surface, said method comprising the steps of extruding a thermoplastic material to produce a hot extrusion, and spraying said extrusion, while said extrusion is still hot, with a mixture of at least two fluids having different thermal conductivities so that said extrusion develops an uneven outer surface due to different rates of shrinkage caused by said different thermal conductivities.

2. A method as set forth in claim 1 wherein said thermoplastic material is polyvinyl chloride.

3. A method as set forth in claim 2 wherein said polyvinyl chloride is flexible.

4. A method as set forth in claim 1 wherein said thermoplastic material is extruded at a temperature of at least approximately 300 degrees Fahrenheit.

5. A method as set forth in claim 1 wherein said mixture includes water and air.

6. A method as set forth in claim 5 wherein said water is at a temperature of approximately 70 degrees Fahrenheit.

7. A method as set forth in claim 1 wherein said mixture includes air and a solvent.

8. A method of manufacturing a welting for a seat such as an automobile seat, said method comprising the steps of extruding a thermoplastic material to produce a hot extrusion in the form of a seat welting having a bead portion, and spraying said bead portion, while said extrusion is still hot, with a mixture of at least two fluids having different thermal conductivities so that said bead portion develops an uneven outer surface due to different rates of shrinkage caused by said different thermal conductivities.

9. A method as set forth in claim 8 wherein said thermoplastic material is polyvinyl chloride.

10. A method as set forth in claim 9 wherein said polyvinyl chloride is flexible.

11. A method as set forth in claim 8 wherein said thermoplastic material is extruded at a temperature of at least approximately 300 degrees Fahrenheit.

12. A method as set forth in claim 8 wherein said mixture includes water and air.

13. A method as set forth in claim 12 wherein said water is at a temperature of approximately 70 degrees Fahrenheit.

14. A method as set forth in claim 8 wherein said mixture includes air and a solvent.

15. Apparatus for manufacturing an extrusion having an uneven outer surface, said apparatus comprising a mechanism for extruding a thermoplastic material to produce a hot extrusion, and a mechanism for spraying said extrusion, while said extrusion is still hot, with a mixture of at least two fluids having different thermal conductivities so that said extrusion develops an uneven outer surface due to different rates of shrinkage caused by said different thermal conductivities.

16. Apparatus as set forth in claim 15 wherein said thermoplastic material is polyvinyl chloride.

17. Apparatus as set forth in claim 16 wherein said polyvinyl chloride is flexible.

18. Apparatus as set forth in claim 15 wherein said thermoplastic material is extruded at a temperature of at least approximately 300 degrees Fahrenheit.

19. Apparatus as set forth in claim 15 wherein said mixture includes water and air.

20. Apparatus as set forth in claim 19 wherein said water is at a temperature of approximately 70 degrees Fahrenheit.

21. Apparatus as set forth in claim 15 wherein said mixture includes air and a solvent.

\* \* \* \* \*